United States Patent [19]

Couture et al.

[11] 4,137,839

[45] Feb. 6, 1979

[54] VEGETABLE PEELING APPARATUS

[76] Inventors: Fernand Couture; René Allard, both of 2350 Edouard-Montpetit Blvd., Montreal, Quebec, Canada, H3T 1J4

[21] Appl. No.: 805,985

[22] Filed: Jun. 13, 1977

[51] Int. Cl.² ............................................. A23N 7/02
[52] U.S. Cl. ...................................... 99/541; 99/594; 99/599
[58] Field of Search ................... 99/541, 588, 594–599

[56] References Cited

U.S. PATENT DOCUMENTS

| | | | |
|---|---|---|---|
| 633,932 | 10/1899 | Williamson | 99/598 |
| 2,602,481 | 7/1952 | Salido | 99/598 |

FOREIGN PATENT DOCUMENTS

| | | | |
|---|---|---|---|
| 361886 | 10/1922 | Fed. Rep. of Germany | 99/596 |
| 399045 | 10/1942 | Italy | 99/596 |

*Primary Examiner*—Christopher K. Moore

[57] ABSTRACT

An improved cutting head for a mechanical vegetable and fruit peeling machine, and a machine incorporating the cutting head. The cutting head has an elongated body with means on the body for pivotably connecting it to means on the peeling machine which move the head. The pivot connecting means are located intermediate the ends of the body. A cutting member is mounted on one side of the body with respect to the pivot connection. A portion of the cutting member is spaced outwardly from the side of the body. Preferably, the cutting edge of the cutting portion is aligned with the axis of the pivot connection in a plane which is generally perpendicular to the length of the body. Guide means positioned on the other side of the body forwardly of the cutting member guides the cutting edge at a desired depth when peeling a vegetable.

11 Claims, 7 Drawing Figures

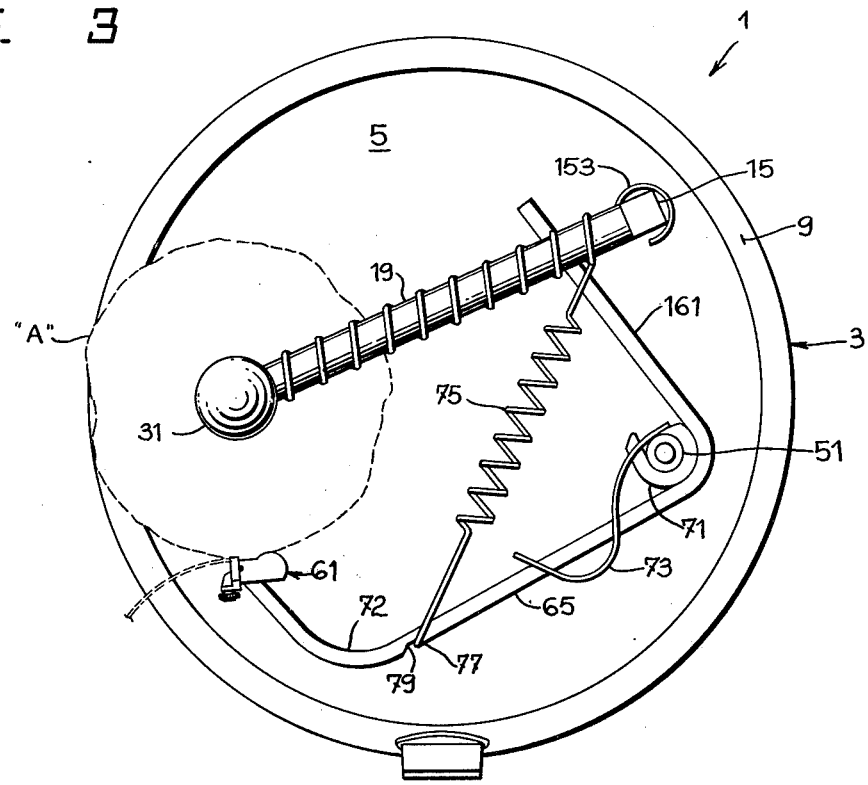
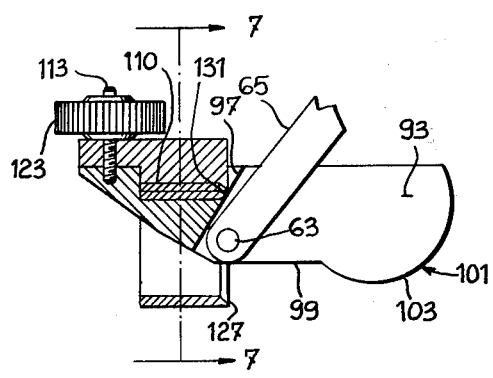
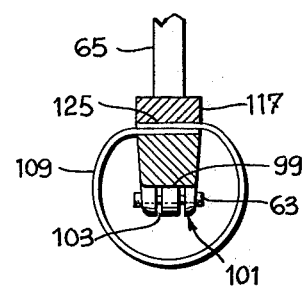

VEGETABLE PEELING APPARATUS

This invention is directed toward an improved mechanical peeling machine for peeling vegetables and the like, and more particularly to an improved cutting heat employed in such machines.

Mechanical peeling machines for peeling potatoes or other vegetables or fruits, to clean them or to obtain useable rind peel, are well known. Examples of such machines are shown in U.S. Pat. Nos. 430,139; 633,932; 2,461,249 and 3,881,406.

The known machines, however, have some difficulty in peeling irregular surfaces. The cutting edge does not always closely follow an irregular contour resulting in unpeeled areas, and/or waste of the vegetable or fruit with too big a slice being taken off.

Many of the known machines also do not allow for variation in the depth of the cut. Variation can be desirable when peeling different vegetables or fruits. A thin cut may, for example, be desirable in peeling apples where the peel is discarded. A thicker cut, however, may be desirable in peeling lemons where it is desired to use the peel as garnish.

It is therefore the purpose of the present invention to provide a peeling machine, and more particularly a cutting head therefor, which more closely follows the contours of a vegetable or the like being peeled.

It is another purpose of the present invention to provide a peeling machine which can make cuts of different depth.

It is a further purpose of the present invention to provide an improved peeling machine which is simple in construction and operation, and yet reliable.

In accordance with the present invention there is provided a cutting heat for use in mechanical peeling machines having an elongated body and means on the body for pivotably connecting it to means in a peeling machine which moves the head. The pivot connecting means are located intermediate the ends of the body. A cutting member is mounted on one side of the body with respect to the pivot connection. A portion of the cutting member is spaced outwardly from the side of the body. Preferably, the cutting edge of the cutting portion is aligned with the axis of the pivot connection in a plane which is generally perpendicular to the length of the body. Guide means are provided on the other side of the body, forwardly of the cutting member, to guide the cutting member portion during peeling.

The cutting member preferably comprises a blade strip bent longitudinally into a generally cylindrical shape. Means are provided for detachably mounting the cylindrically shaped blade on the body, with the blade axis being generally parallel to the side of the body and generally perpendicular to the pivot axis.

In accordance with the present invention, the cutting head is preferably used in a peeling machine which has means for supporting the vegetable to be peeled, and means for rotating the supported vegetable. The machine includes means for moving the cutting head along the supported vegetable in contact therewith as the vegetable is rotated with the cutting edge cutting a continuous strip of peel off the vegetable.

The invention will now be described in detail having reference to the accompanying drawings in which:

FIG. 3 is a plan view of the machine;

FIG. 6 is a plan view, in partial section, of the cutting head; and

FIG. 7 is a cross-section view of the cutting head taken along line 7—7 in FIG. 6.

Figure 1:
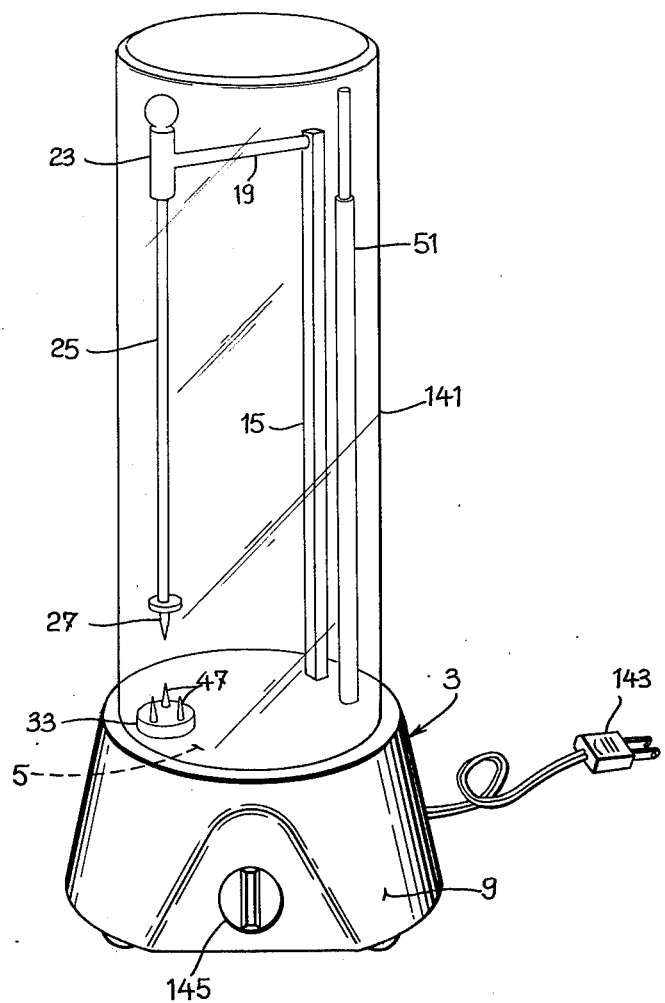
FIG. 1 illustrates the peeling machine.
Figures 2, 4, 5:
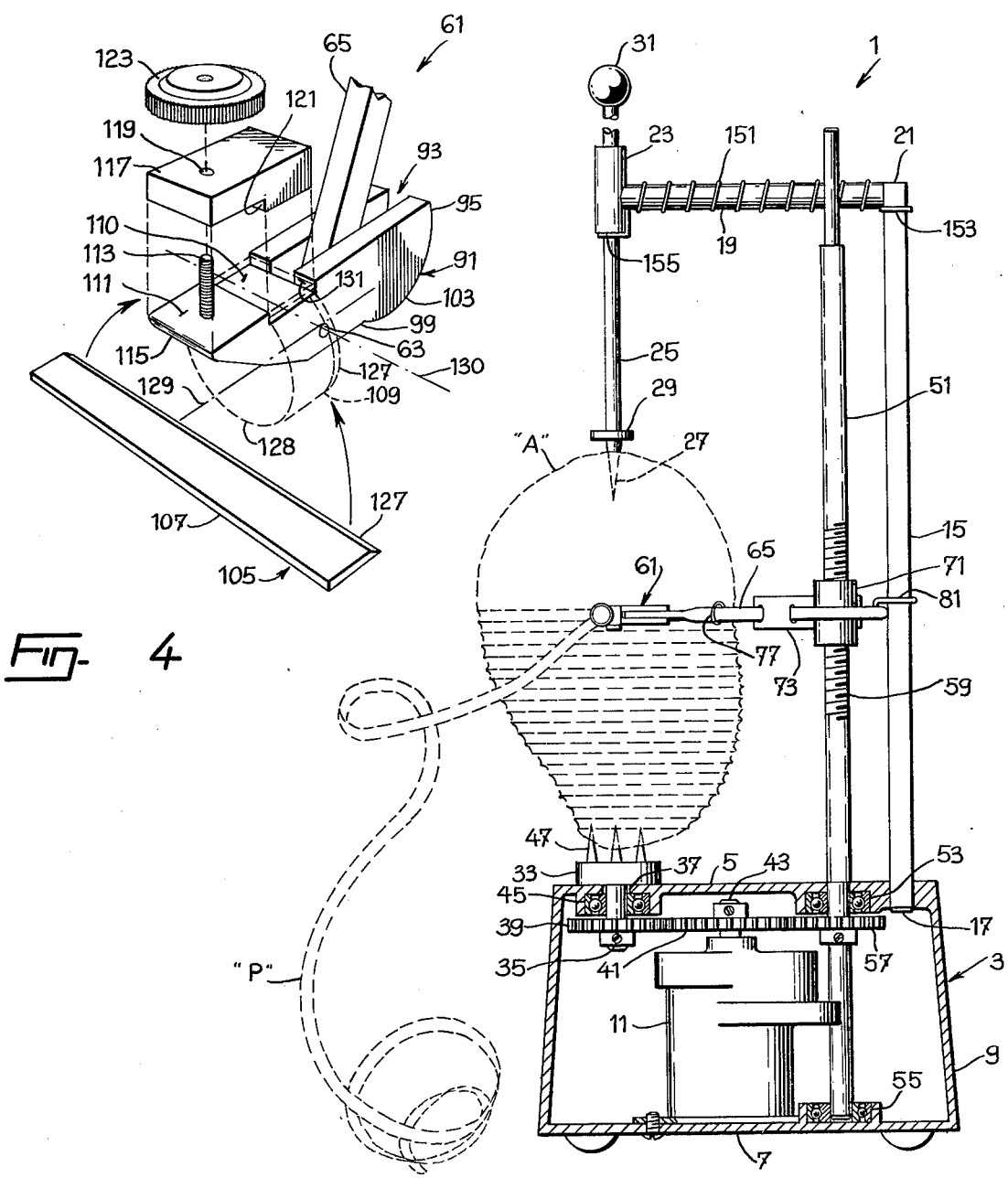
FIG. 2 is an elevation view, in partial section, of the peeling machine.
FIG. 4 is an exploded, schematic view of the cutting head used on the peeling machine.
FIG. 5 is a plan view of the cutting head in operation.

The peeling machine 1 of the present invention, as shown in FIGS. 1 and 2, has a base housing 3 formed from a circular top wall 5, a circular bottom wall 7, and a sidewall 9. A motor 11 for operating the machine is mounted within housing 3 on bottom wall 7.

A vegetable or fruit "A" to be peeled is supported at both ends by support means carried by the housing 3. The support means include a support post 15 fixedly mounted at its bottom end 17 in top wall 5 adjacent its periphery and extending up from the top wall. A cross bar 19 extends horizontally from the top 21 of post 15 over top wall 5. A collar 23 is attached to the free end of cross bar 19. The collar 23 is substantially parallel to post 15. A support rod 25 slidably passes through collar 23. The lower end 27 of rod 25 is pointed to permit rod 25 to penetrate the vegetable "A" from its top end. A stop member 29 can be fixed to rod 25 adjacent its lower end 27 to limit penetration of rod 25 in vegetable "A". The upper end of rod 25 has an enlarged head 31 preventing the rod from passing through collar 23. The head 31 can comprise a ball member threaded onto the end of rod 25. Collar 23 maintains and guides rod 25 vertically.

The support means also includes a bottom support plate or disc 33 positioned beneath rod 25 on top wall 5 of housing 3. The disc 33 has a central stem 35 which projects down through an aperture 37 in top wall 5 adjacent its periphery. The bottom end of the stem 35, within housing 3, has a first driven gear 39 fixed thereto. Gear 39 meshes with a drive gear 41 fixedly mounted on the drive shaft 43 of drive motor 11. A bearing 45 can rotatably mount stem 35 of support disc 33. The bearing 45 can be fixed to the bottom side of top wall 5. The support disc 33 can carry a plurality of upwardly extending prongs 47 on its top surface. The prongs 47 penetrate the bottom end of a vegetable "A" mounted on the machine between rod 25 and disc 33.

The peeling machine 1 has a drive shaft 51 extending up from housing 3 closely adjacent, and parallel to, the support post 15. The drive shaft 51 is firmly, rotatably supported at its lower end within housing 3 with bearings 53, 55 mounted adjacent the top and bottom walls 5, 7 of the housing 3. A second driven gear 57 is fixed to shaft 51 within housing 3 and meshes with drive gear 41 on motor 11. The drive shaft 51 extends up from top wall 5 to a height substantially the same as the height of post 15. The major portion of the length of shaft 51 above housing 3 is provided with a screw thread 59.

A cutting head 61 is carried by shaft 51. More particularly, the head 61 is pivotably connected, intermediate its ends, by a vertical pin 63 to one end of a horizontal support arm 65. The support arm 65 is fixed at its other end to a threaded collar 71 threadably mounted on shaft 51. The support arm 65 extends over the housing 3, with a major portion of its length substantially parallel to cross bar 19. The outer end of the arm 65 is bent inwardly at bend 72 to extend more directly toward the common vertical axis of rod 25 and disc 33. A stiff strip of material 73 can also be fixed to collar 71, at one end and along one side thereof, and fixed at one or two points spaced outwardly from collar 71 to arm 65 to stiffen it. A tension spring 75 is connected between arm 65 and support post 15. The tension spring 75 is connected at one end 77 to a notch 79 in arm 65 near bend 72. The other end 81 of spring 75 is slidably hooked about post 15.

The cutting head 61, as shown in FIGS. 4 to 7, has a generally elongated body 91. A central slot 93 extends longitudinally into the body 91, for a major portion of its length, from leading end 95 of body 91. The support arm 65 fits into slot 93 at an angle to body 91 and is pivotably connected to body 91 by pin 63 extending transverse to slot 93 and adjacent slot base wall 97. The pin 63 is located as close as possible to the side 99 of body 91 away from support arm 65.

Guide means 101 are provided on cutting head 61. The guide means 101 are located at or near leading end 95 and can comprise rounded ears 103 extending laterally out from side 99 of body 91.

Cutting means 105 are also provided on head 61. The cutting means 105 can comprise a blade strip 107 formed into a cutting circle 109 and fastened to body 91. As shown in FIGS. 4 and 6, a notch or shallow blade mounting groove 110 is formed in body 91 in side 111 opposite side 99. The groove 110 is adjacent the end of slot 93 and extends transversely across body 91. Adjacent the groove 110 there is a threaded stud 113 projecting laterally out from side 111 of body 91 and near the trailing end 115 of body 91. A separate clamping block 117 is provided having a through hole 119 at one end. The block 117 has a raised portion 121 at its other end which fits in groove 110. A knurled nut 123 is also provided.

The blade strip 107 is bent into a circle 109 and its overlapped ends 125 are placed in groove 110, with the cutting edge 127 of the blade facing toward leading end 95 of body 91. Block 117 is positioned on side 111 of body 91 with its raised portion 121 fitting in groove 110 to lie on ends 125 of blade 107 and with stud 113 extending through hole 119 therein. Nut 123 is threaded onto stud 113 to tightly clamp blade 107 between clamping block 117 and body 91. The mounted cylindrically-shaped blade 109 has a portion 128 spaced away from side 99 but substantially parallel to it. The axis 129 of the cylindrically-shaped blade 109 is substantially parallel to side 99 and substantially perpendicular to pivot axis 130 as seen in FIG. 4.

The groove 110 is formed with its edge 131, closest to leading end 95, substantially perpendicular to sides 99, 111 of body 91 and aligned with pivot pin 63. This location of groove edge 131 positions the plane of cutting edge 127 of blade circle 109 to substantially coincidently with the axis 130 of pivot pin 63. Location of the cutting edge 127 at this position is an important feature of the present invention since it permits the cutting blade circle 109 to more readily follow the contours of the vegetable being peeled and thus provides more even peeling with a minimum of waste as will be described.

In operation, a covering case 141, shown in FIG. 1, is removed from the machine 1 and a fruit or vegetable "A" to be peeled is mounted at its end between rod 25 and the prongs 47 on support disc 33. The prongs 47 are arranged to prevent the vegetable "A" from turning on support disc 33. The vegetable "A" is preferably mounted to have its long axis substantially coinciding with the aligned axis of rod 25 and disc 33. The cutting head 61 is positioned against the vegetable "A" at its bottom end adjacent disc 33 and an initial cut into the skin of the vegetable can be manually made with the cutting edge 127 of the blade circle 109. Tension spring 75 biases the head 61 against the vegetable "A" with guide ears 103 touching the vegetable.

The machine 1 is plugged in via a power cord 143 and a switch 145 is operated to turn motor 5 on. As motor 5 operates, gear 41 drives gears 39, 57 rotating both disc 33 and the vegetable "A" resting thereon, and drive shaft 51. As shaft 51 is rotated, collar 71 climbs up shaft 51 via screw thread 59 causing cutting head 61 to move up vegetable "A" as it helically peels the skin while the vegetable "A" rotates. As the vegetable " is rotated past cutting edge 127, a continuous strip of peel "P" is peeled off, passing between the spaced-apart portion 128 of circle cutter 109 and body 91. Spring 75 biases head 61 continually against the vegetable as head 71 is moved up. The guide means 101 follow irregularities in the surface being peeled, and through its movement, pivots body 91 about pivot pin 63. Since the cutting edge 127 is substantially coincident with pin 63, and the plane containing edge 127 and the axis 130 of pin 63 is substantially normal to the direction of travel of head 61, movement of body 91 about pin 63 will move cutting edge 127 of blade portion 128 toward or away from the surface it was cutting substantially parallel to before body 91 was moved. In this manner, the cutting edge 127 follows the vegetable contour quite closely.

Once the cutting head 61 reaches the top of the vegetable, the machine is stopped, and the peeled vegetable removed by raising rod 25 and lifting it off prongs 47. The motor can be reversed to lower head 61 down shaft 51 to its bottom position ready to peel the next vegetable.

If desired, a coil spring 151 can be provided on cross bar 19 with one end 153 fastened about post 15 and the other end 155 looped about rod 25 just under collar 23. The spring 151, pulling rod 25 against collar 23, serves to hold rod 25 in any one vertical position. When the rod 25 is raised to remove vegetable "A", it can be released in the raised position, and it will stay in the raised position due to the action of spring 151.

To assist the tension spring 75 in moving up post 15 as head 61 is raised, support arm 65 can be provided with an extension 161 extending from shaft 51 to a position just in front of post 15. The end 81 of spring 75 rests on extension 161. As arm 65 moves up, arm extension 161 slides spring 75 up along post 15.

The thickness of peel "P" cut from the vegetable can be varied by using blades 107 of various lengths. The longer the blade 107 used, the larger the diameter of the cutting circle 109 and the further the blade portion 128, and its cutting edge 127 is offset inwardly from the plane of the outer surface of the vegetable.

We claim:

1. In a mechanical machine for peeling vegetables and the like, said machine including
    means for mounting a vegetable to be peeled;
    means connected with said mounting means, operable for rotating a mounted vegetable about an axis of rotation;
    a support arm;
    means for mounting one end of said support arm, operable to move said support arm along an axis parallel with said axis of rotation, the other end of said support arm being engageable with a mounted vegetable; and means resiliently urging said other end of said support arm toward a vegetable to be peeled, the improvement comprising:

a cutting head mounted on said other end of said support arm, said cutting head including:

an elongated body having, relative to the direction of rotation of a vegetable mounted in said machine for peeling, a leading end and a trailing end;

means mounting said elongated body to said other end of said support arm for pivotal movement about a pivotal axis lying parallel to said axis of rotation and extending transversely of said arm, said pivotal axis being located intermediate said leading and said trailing ends of said elongated body;

said elongated body including a first side surface disposed to face a vegetable mounted in said machine for peeling, said side surface extending from the region of said pivotal axis toward said leading end, and terminating at said leading end in guide means arranged to project outwardly from said side surface toward said vegetable, said guide means comprising at least one rounded ear, the tip of said rounded ear engaging the surface of said vegetable in point contact to sense the configuration thereof; and a cutting member secured to the trailing end of said elongated body, said cutting member including a hollow, generally cylindrical cutting body extending for a substantial distance in the direction of the longitudinal axis of the cylinder and arranged to project from said first side surface of said elongated body, the outer cylindrical surface of said cutting body engaging said vegetable, said first side surface being spaced from said vegetable when said tip of said rounded ear of said guide means and said cutting body are in engagement therewith, said cutting body including a cutting edge that faces toward said leading end, the portion of the cutting edge which first engages said vegatable lying in a first plane that generally includes said pivotal axis and which extends normal to said longitudinal axis of said cylinder, and said tip of said rounded ear of said guide means lying in a second plane that extends parallel to the longitudinal axis of said cylinder and which is positioned between and spaced from said pivotal axis and said outer cylindrical surface of said cutting body, whereby said rounded ear of said guide means is effective to position said cylindrical cutting body to cut generally parallel to the surface of the vegetable and to follow any change in contour of the vegetable's outer surface.

2. In a machine for peeling vegetables and the like as recited in claim 1, wherein said pivotal axis is positioned in closely spaced relationship to said first side surface.

3. In a machine for peeling vegetables and the like as recited in claim 1, wherein said cutting body comprises a blade strip bent longitudinally into a generally cylindrical shape.

4. In a machine for peeling vegetables and the like as recited in claim 3, wherein said cutting body is detachably secured to a second side surface of said elongated body, said second side surface being opposite said first side surface and having notch means therein of a width and depth to receive the end portions of said blade strip, and said blade strip being secured by connecting means, including:

clamping block means, a portion of said clamping block means being receivable within said notch means and engageable with said blade end portions; and fastener means carried by said elongated body and engageable with said clamping block means, effective to securely clamp said blade end portions in position between said clamping block means and the bottom wall of said notch means.

5. In a machine for peeling vegetables and the like as recited in claim 3, including at least one other blade strip having a different length from the one blade strip, and which could replace the one blade strip to position the cutting body a different distance from said first side surface of said elongated body.

6. A mechanical peeling machine for peeling vegetables and the like, including:

means for mounting a vegetable to be peeled;

means connected with said mounting means, operable for rotating a mounted vegetable about an axis of rotation;

a support arm;

means for mounting one end of said support arm, operable to move said support arm along an axis parallel with said axis of rotation, the other end of said support arm being engageable with a mounted vegetable;

a cutting head mounted on said other end of said support arm, and including:

an elongated body having, relative to the direction of rotation of a vegetable to be peeled, a leading end and a trailing end;

means mounting said elongated body to said other end of said support arm for pivotal movement about a pivotal axis lying parallel to said axis of rotation and extending transversely of said support arm, said pivotal axis being located intermediate said leading and said trailing ends of said elongated body;

said elongated body including a first side surface disposed to face said vegetable to be peeled and which extends from the region of said pivotal axis toward said leading end, said side surface terminating at said leading end in guide means arranged to project outwardly from said side surface toward said vegetable, said guide means comprising at least one rounded ear, the tip of said rounded ear engaging the surface of said vegetable in point contact to sense the configuration thereof; and a cutting member secured to the trailing end of said elongated body, said cutting member including a hollow, generally cylindrical cutting body extending for a substantial distance in the direction of the longitudinal axis of the cylinder and arranged to project from said first side surface of said elongated body, the outer cylindrical surface of said cutting body engaging said vegetable, said first side surface being spaced from said vegetable when said tip of said rounded ear of said guide means and said cutting body are in engagement therewith, said cutting body including a cutting edge that faces toward said leadind end, the portion of the cutting edge which first engages said vegetable lying in a first plane that generally includes said pivotal axis and which extends normal to said longitudinal axis of the cylinder, and said tip of said rounded ear of said guide means lying in a second plane that extends parallel to the longitudinal axis of said cylinder and which is positioned between and spaced from said pivotal axis and said outer cylindrical surface of said cutting body, whereby said rounded ear of said guide means is effective to position said cylindrical cutting body to cut generally parallel to the surface of the vegetable and to follow any change in contour of the vegetable's outer surface; and means resiliently urging said other end of said support arm toward a vegetable to be peeled, to engage said cutting body therewith.

7. A mechanical peeling machine as recited in claim 6, wherein said pivotal axis is positioned in closely spaced relationship to said first side surface.

8. A mechanical peeling machine as recited in claim 7, wherein said cutting body comprises a blade strip bent longitudinally into a generally cylindrical shape, the opposite end portions of said blade strip being releasably secured to a second side surface of said elongated body by connecting means.

9. A mechanical peeling machine as recited in claim 8, including at least one other blade strip having a different length from the one blade strip, and which could replace the one blade strip to position the cutting body a different distance from said first surface of said elongated body.

10. A mechanical peeling machine as recited in claim 6, wherein said means mounting said one end of said support arm and operable for moving the same includes:
a rotatable screw shaft extending parallel to said axis of rotation and having a threaded collar thereon, said one end of said support arm being pivotally connected with said threaded collar; and
motor means for rotating said screw shaft.

11. A mechanical peeling machine as recited in claim 10, wherein said means for resiliently urging said other end of said support arm toward said vegetable to be peeled includes:
a support post extending generally parallel to said screw shaft;
a spring connected at one end thereof to said other end of said support arm, the other end of said spring being slidably received on said support post; and
means on said threaded collar supporting the other end of said spring, to slide it along said support post as said threaded collar moves along said screw shaft.

* * * * *